United States Patent Office 3,080,273
Patented Mar. 5, 1963

3,080,273
AMINOBUTYNYL PHOSPHATES
Joseph W. Baker and John P. Chupp, Kirkwood, and Peter E. Newallis, Crestwood, Mo., assignors to Monsanto Chemical Company, St. Louis, Mo., a corporation of Delaware
No Drawing. Filed Nov. 9, 1959, Ser. No. 851,555
14 Claims. (Cl. 167—22)

This invention relates to new organic phosphorus compounds and to insecticidal formulations comprising such compounds. More particularly, the invention is concerned with those phosphorous compounds which are derived from the interaction of an amine and a halogenated butynyl salt of a phosphoric acid.

It is an object of this invention to provide new and useful compounds of phosphorus. It is a further object of this invention to provide a new class of highly useful insecticides. Still a further object is to provide new and useful formulations comprising such insecticides.

The compounds of the present invention are phosphorus derivatives of the general formula:

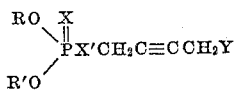

wherein R and R' represent like or unlike lower alkyl radicals or alkoxy substituted lower alkyl radicals, and X and X' are oxygen or sulfur. As employed herein, the term "lower" connotes radicals having from 1 to about 4 carbon atoms. In the above formula, Y represents heterocyclic amino radicals, quaternary ammonium salt radicals or an amino radical of the general structure

wherein R" and R''' are selected from hydrogen, acyclic radicals, alicyclic radicals or aryl radicals. As employed herein, the term "quaternary ammonium salt radical" connotes a quaternary ammonium salt which has an open valence on the nitrogen atom. The acyclic and alicyclic radicals contemplated by this invention are those containing up to about 8 carbon atoms.

Illustrative, but not limitative, of the heterocyclic amino radicals represented by Y are azirino, aziridino, azetino, azetidino, pyrrolyl, pyrrolinyl, pyrrolidinyl, pyrazolyl, imidazolyl, triazolyl, pyridyl, piperidyl, morpholino, pyrazinyl, piperazino, azepidino, diazepino and the like. Among the quaternary salt radicals represented by Y are those wherein the anion is chloride, bromide, iodide, fluoride, sulfate, phosphate, nitrate, citrate, oxalate, tartrate or the like.

Exemplary of the radicals represented by R" and R''' are the alkyls such as methyl, ethyl, n-propyl, isopropyl, n-butyl, tertiary butyl, isoamyl, n-hexyl, 2-methyl-1-pentyl, n-heptyl, 3-ethyl-2-pentyl, n-octyl, 2-ethylhexyl, etc.; the alkenyls and alkynyls such as vinyl, allyl, n-butenyl-2, diisobutenyl, propynyl, 2-butynyl, 3-hexynyl, etc.; other acyclics such as methoxyethyl, ethoxyethyl, 2-chloroethyl, 2-chloroallyl, benzyl, cyanoethyl, cyanobutyl, hydroxypropyl, hydroxypentyl, ethoxycarbonylethyl, methoxycarbonylpropyl, etc; alicyclics such as cyclopropyl, cyclopentyl, cycloheptyl, etc.; and aryls such as phenyl, naphthyl, xenyl, chlorophenyl, nitrophenyl, methoxyphenyl, etc.

Included within the above general formula is a preferred group of compounds which have the structure:

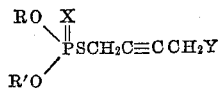

where R, R' and X have the same meaning as above, and Y is selected from di-lower acyclic amino radicals or morpholino. Such compounds display an optimum degree of biocidal activity against a wide variety of pests.

The new compounds of this invention may be readily prepared by reacting a primary or secondary amine with the reaction product of a dihalogenated butyne and a salt of a phosphoric acid. The proportions of reactants will vary in accordance with the particular resultant product. The reaction of the amine, the butyne and the acid salt may also be carried out in situ.

The invention will be more fully understood by reference to the following examples. These examples, however, are given for the purpose of illustration only and are not to be construed as limiting the scope of the present invention in any way.

EXAMPLE I

O,O-Diethyl S-(4-Diethylamino)-2-Butynyl Phosphorothiolate

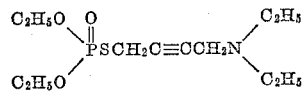

In a suitable reactor was placed 56.1 grams (0.3 mole) of ammonium O,O-diethyl phosphorothioate dissolved in 150 ml. of acetone at 50° C. There was added 37.5 grams (0.3 mole) of 1,4-dichlorobutyne-2, and the mixture was heated to reflux for 3 hours. 45.2 grams (0.62 mole) of diethyl amine was then added, and this mixture was refluxed for 4 hours. The reaction product was filtered and washed with fresh acetone. The filtrate was then stripped of acetone, and the residue was diluted with water. It was then extracted with chloroform, washed with sodium carbonate solution, and finally stripped to 130° C. at 4 mm. pressure. There was obtained 37.0 grams (63% of theory) of O,O-diethyl S-(4-diethylamino)-2-butynyl phosphorothiolate as a viscous amber liquid.

EXAMPLE II

O,O-Diethyl S-(4-Diallylamino)-2-Butynyl Phosphorothiolate

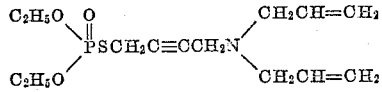

A suitable reactor was charged with 25.7 grams (0.1 mole) of S-(4-chloro-2-butynyl) O,O-diethyl phosphorothiolate and 21.4 grams (0.22 mole) of diallylamine. The mixture was refluxed for 4 hours, and a precipitate appeared. It was then cooled. The mixture was filtered, and the precipitate washed with acetone. The latter was stripped off, and the residue was extracted with chloroform, washed with water, and stripped to a temperature of 110° C. at 3 mm. pressure. A yield of 23.5 grams (75% of theory) of O,O-diethyl S-(4-diallylamino)-2-butynyl phosphorothiolate was obtained as an amber liquid. Analysis showed 9.5% phosphorus and 4.1% nitrogen as compared to the calculated values of 9.8% phosphorus and 4.4% nitrogen.

EXAMPLE III

**O,O-*Diethyl* S-(*4-Dimethylamino*)-*2-Butynyl* *Phosphorothiolate***

$$\begin{array}{c}C_2H_5O\\ \diagdown\\ C_2H_5O\end{array}\!\!\overset{O}{\underset{\phantom{|}}{\overset{\|}{P}}}\!\!SCH_2C\!\equiv\!CCH_2N\!\!\begin{array}{c}\diagup CH_3\\ \diagdown CH_3\end{array}$$

In the procedure of Example II, 10 grams (0.22 mole) of dimethylamine was substituted for the diallylamine. The phosphorothiolate was dissolved in 100 ml. of acetone and the gaseous amine was introduced. The yield was 10.0 grams (39.2% of theory) of O,O-diethyl S-(4-dimethylamino)-2-butynyl phosphorothiolate as an amber liquid. As compared to calculated value of 11.7% phosporous, it analyzed as 12.1% phosphorous.

EXAMPLE IV

**O,O-*Diethyl* S-(*4-Ethylamino*)-*2-Butynyl* *Phosphorothiolate***

$$\begin{array}{c}C_2H_5O\\ \diagdown\\ C_2H_5O\end{array}\!\!\overset{O}{\underset{\phantom{|}}{\overset{\|}{P}}}\!\!SCH_2C\!\equiv\!CCH_2N\!\!\begin{array}{c}\diagup C_2H_5\\ \diagdown H\end{array}$$

A reactor was charged with 12.9 grams (0.05 mole) of S-(4-chloro-2-butynyl) O,O-diethyl phosphorothiolate in 50 ml. of benzene, 2.2 grams (0.05 mole) of ethylamine, and 5.0 grams (0.05 mole) of triethylamine, the latter two being in 100 ml. of benzene. The mixture was stirred at room temperature for 6 hours and then heated to 30°–35° C. for 2 additional hours. The reaction product was filtered, and the filtrate was washed with water and stripped to 110° C. at 8 mm. pressure. There was obtained 9.8 grams (74% of theory) of O,O-diethyl S-(4-ethylamino)-2-butynyl phosphorothiolate as an amber liquid.

EXAMPLE V

**O,O-*Diethyl* S-(*4-Allylamino*)-*2-Butynyl* *Phosphorothiolate***

$$\begin{array}{c}C_2H_5O\\ \diagdown\\ C_2H_5O\end{array}\!\!\overset{O}{\underset{\phantom{|}}{\overset{\|}{P}}}\!\!SCH_2C\!\equiv\!CCH_2N\!\!\begin{array}{c}\diagup CH_2CH=CH_2\\ \diagdown H\end{array}$$

In the procedure of Example IV, 2.9 grams (0.05 mole) of allylamine was substituted for the ethylamine. The mixture was heated to 30°–40° C. for 5 hours, and at 60° C. for 2 additional hours. The reaction product was worked up as in Example IV. A yield of 13.7 grams (100% of theory) of O,O-diethyl S-(4-allylamino)-2-butynyl phosphorothiolate as an amber liquid.

EXAMPLE VI

**O,O-*Diethyl* S-(*4-Dimethylamino*)-*2-Butynyl* *Phosphorodithioate***

$$\begin{array}{c}C_2H_5O\\ \diagdown\\ C_2H_5O\end{array}\!\!\overset{S}{\underset{\phantom{|}}{\overset{\|}{P}}}\!\!SCH_2C\!\equiv\!CCH_2N\!\!\begin{array}{c}\diagup CH_3\\ \diagdown CH_3\end{array}$$

Into a suitable reactor was charged 21.8 grams (0.08 mole) of S-(4-chloro-2-butynyl) O,O-diethyl phosphorodithioate in 100 ml. of benzene. 9.0 grams (0.2 mole) of dimethylamine was passed into the solution of 0°–10° C., and the mixture was stirred at room temperature for 6 hours. The reaction mixture was then filtered, and the filtrate washed with water and stripped to 130° C. at 2 mm. pressure. There was obtained 13 grams (58% of theory) of a viscous dark brown liquid which was identified as O,O-diethyl S-(4-dimethylamino)-2-butynyl phosphorodithioate. Analysis showed 11.9% phosphorus as compared with a calculated value of 11.0% phosphorous.

EXAMPLE VII

**O,O-*Diethyl* S-(*4-N-Ethylanilino*)-*2-Butynyl* *Phosphorodithioate***

$$\begin{array}{c}C_2H_5O\\ \diagdown\\ C_2H_5O\end{array}\!\!\overset{S}{\underset{\phantom{|}}{\overset{\|}{P}}}\!\!SCH_2C\!\equiv\!CCH_2N\!\!\begin{array}{c}\diagup C_2H_5\\ \diagdown C_6H_5\end{array}$$

A reactor was charged with 13.7 grams (0.05 mole) of S-(4-chloro-2-butynyl) O,O-diethyl phosphorodithioate, 6.5 grams (0.05 mole) of N-ethylaniline, 5.1 grams (0.05 mole) of triethylamine and 200 ml. of benzene. The mixture was stirred at reflux for 6 hours. The reaction product was filtered, and the filtrate was washed with water and stripped to 120° C. at 2 mm. pressure. A yield of 10.5 grams (59% of theory) of O,O-diethyl S-(N-ethylanilino)-2-butynyl phosphorodithioate was obtained as an amber liquid.

EXAMPLE VIII

**O,O-*Diethyl* S-(*4-N-Ethylanilino*)-*2-Butynyl* *Phosphorothiolate***

$$\begin{array}{c}C_2H_5O\\ \diagdown\\ C_2H_5O\end{array}\!\!\overset{O}{\underset{\phantom{|}}{\overset{\|}{P}}}\!\!SCH_2C\!\equiv\!CCH_2N\!\!\begin{array}{c}\diagup C_2H_5\\ \diagdown C_6H_5\end{array}$$

In the procedure of Example VII, 12.8 grams (0.05 mole) of S-(4-chloro-2-butynyl) O,O-diethyl phosphorothiolate was substituted for the dithioate, and only 100 ml. of benzene was employed. There was obtained 13.5 grams (80% of theory) of O,O-diethyl S-(N-ethylanilino)-2-butynyl phosphorothiolate as an amber liquid. As compared to calculated values of 9.1% phosphorous and 4.1% nitrogen, it analyzed as 8.6% phosphorous and 4.5% nitrogen.

EXAMPLE IX

**O,O-*Diethyl* S-(*4-Allylamino*)-*2-Butynyl* *Phosphorodithioate*s**

$$\begin{array}{c}C_2H_5O\\ \diagdown\\ C_2H_5O\end{array}\!\!\overset{S}{\underset{\phantom{|}}{\overset{\|}{P}}}\!\!SCH_2C\!\equiv\!CCH_2N\!\!\begin{array}{c}\diagup H\\ \diagdown CH_2CH=CH_2\end{array}$$

A suitable reactor was charged with 13.7 grams (0.05 mole) of S-(4-chloro-2-butynyl) O,O-diethyl phosphorodithioate, 2.9 grams (0.05 mole) of allylamine, 5.1 grams (0.05 mole) of triethylamine and 150 ml. of benzene. This mixture was heated with stirring at 30°–40° C. for 3 hours and then refluxed for 2 additional hours. The reaction product was filtered, and the filtrate was washed with water and stripped to 110° C. at 3 mm. pressure. There was obtained 12 grams (82% of theory) of O,O-diethyl S-(4-allylamino)-2-butynyl phosphorodithioate.

EXAMPLE X

**O,O-*Diethyl* S-(*4-Diallylamino*)-*2-Butynyl* *Phosphorodithioate*s**

$$\begin{array}{c}C_2H_5O\\ \diagdown\\ C_2H_5O\end{array}\!\!\overset{S}{\underset{\phantom{|}}{\overset{\|}{P}}}\!\!SCH_2C\!\equiv\!CCH_2N\!\!\begin{array}{c}\diagup CH_2CH=CH_2\\ \diagdown CH_2CH=CH_2\end{array}$$

Into a suitable reactor was charged 8.0 grams (0.082 mole) of diallylamine, 8.3 grams (0.082 mole) of triethylamine, 21.8 grams (0.082 mole) of S-(4-chloro-2-butynyl) O,O-diethyl phosphorodithioate, and 100 ml. of acetone. This mixture was heated with stirring for 5 hours at reflux. The reaction product was stripped of acetone, and the residue was extracted with chloroform, washed with water and stripped to 110° C. at 2 mm. pressure. A yield of 21.3 grams (78% of theory) of O,O-diethyl S-(4-diallylamino)-2-butynyl phosphorodithioate was obtained as an amber liquid.

EXAMPLE XI

**O,O-*Diethyl* S-(*4-N-Para-Chloroanilino*)-*2-Butynyl* *Phosphorothiolate*s**

$$\begin{array}{c}C_2H_5O\\ \diagdown\\ C_2H_5O\end{array}\!\!\overset{O}{\underset{\phantom{|}}{\overset{\|}{P}}}\!\!SCH_2C\!\equiv\!CCH_2N\!\!\begin{array}{c}\diagup H\\ \diagdown C_6H_4Cl\end{array}$$

A suitable reactor was charged with 10.2 grams (0.04 mole) of S-(4-chloro-2-butynyl) O,O-diethyl phosphorothiolate, 5.1 grams (0.04 mole) of para-chloroaniline and 4.1 grams (0.04 moles) of triethylamine, the latter two in 100 ml. of toluene. The mixture was heated at 100° C. for 6 hours. The reaction product was then filtered, and the filtrate was washed with water and stripped to 120° C. at 2 mm. pressure. There was obtained 5 grams (36% of theory) of O,O-diethyl S-(N-para-chloroanilino)-2-butynyl phosphorothiolate as a viscous amber liquid.

EXAMPLE XII

O,O-*Diethyl S-(4-Diisopropylamino)-2-Butynyl Phosphorothiolate*

$$\begin{array}{c}C_2H_5O\\ \diagdown\overset{O}{\underset{\parallel}{P}}SCH_2C\equiv CCH_2N\diagup CH(CH_3)_2\\ C_2H_5O\diagup \diagdown CH(CH_3)_2\end{array}$$

A suitable reactor was charged with 5.1 grams (0.05 mole) of each of diisopropylamine and triethylamine, and 150 ml. of chloroform. There was then added 12.9 grams (0.05 mole) of S-(4-chloro-2-butynyl) O,O-diethyl phosphorothiolate with moderate cooling. The reaction mixture was heated at refluxing temperature for 5 hours and then cooled. The reaction product was filtered, and the filtrate was washed with water and stripped to 120° C. at 1 mm. pressure. A yield of 14 grams (87% of theory) of O,O-diethyl S-(4-diisopropylamino)-2-butynyl phosphorothiolate was obtained as an amber liquid.

EXAMPLE XIII

O,O-*Diethyl S-(4-Di-n-Propylamino)-2-Butynyl Phosphorothiolate*

$$\begin{array}{c}C_2H_5O\\ \diagdown\overset{O}{\underset{\parallel}{P}}SCH_2C\equiv CCH_2N\diagup CH_2CH_2CH_3\\ C_2H_5O\diagup \diagdown CH_2CH_2CH_3\end{array}$$

In the procedure of Example XII, di-n-propylamine was substituted for the diisopropylamine. There was obtained 13.8 grams (86% of theory) of O,O-diethyl S-(4-di-n-propylamino)-2-butynyl phosphorothiolate as an amber liquid.

EXAMPLE XIV

O,O-*Diethyl S-(4-Tert.-Butylamino)-2-Butynyl Phosphorothiolate*

$$\begin{array}{c}C_2H_5O\\ \diagdown\overset{O}{\underset{\parallel}{P}}SCH_2C\equiv CCH_2N\diagup H\\ C_2H_5O\diagup \diagdown C(CH_3)_3\end{array}$$

In the procedure of Example XII, 3.7 grams (0.05 mole) of tert.-butylamine was substituted of the diisopropylamine. The reaction product was worked up in the same manner except that the final stripping was to 110° C. at 1 mm. pressure. A yield of 10.0 grams (68% of theory) of O,O-diethyl S-(4-tert.-butylamino)-2-butynyl phosphorothiolate was obtained as an amber liquid. Analysis showed 11.31% phosphorus as against a calculated value of 10.6% phosphorus.

EXAMPLE XV

O,O-*Diethyl S-(4-Anilino)-2-Butynyl Phosphorothiolate*

$$\begin{array}{c}C_2H_5O\\ \diagdown\overset{O}{\underset{\parallel}{P}}SCH_2C\equiv CCH_2N\diagup H\\ C_2H_5O\diagup \diagdown C_6H_5\end{array}$$

Into a suitable reactor was charged 4.7 grams (0.05 mole) of aniline, 5.1 grams (0.05 mole) of triethylamine and 150 ml. of benzene. 12.8 grams (0.05 mole) of S-(4-chloro-2-butynyl)-O,O-diethyl phosphorothiolate was added, and the mixture was heated at 60°–65° C. for 10 hours. The reaction product was filtered, and the filtrate was washed with water and stripped to 130° C. at 1 mm. pressure. There was obtained 5.0 grams of O,O-diethyl S-(anilino)-2-butynyl phosphorothiolate as an amber liquid.

EXAMPLE XVI

O,O-*Diethyl S-(4-Para-Anisoyl)-2-Butynyl Phosphorothiolate*

$$\begin{array}{c}C_2H_5O\\ \diagdown\overset{S}{\underset{\parallel}{P}}SCH_2C\equiv CCH_2N\diagup H\diagdown\\ C_2H_5O\diagup \diagup\diagdown\text{—}OCH_3\end{array}$$

In the procedure of Example XV, 6.1 grams (0.05 mole) of anisidine was substituted for the aniline, and the mixture was refluxed for 8 hours. The final stripping was to 140° C. at 1 mm. A yield of 9.5 grams (44% of theory) of O,O-diethyl S-(para-anisoyl)-2-butynyl phosphorothiolate was obtained as a viscous amber liquid.

EXAMPLE XVII

O,O-*Diethyl S-(4-Diethylamino)-2-Butynyl Phosphorodithioate*

$$\begin{array}{c}C_2H_5O\\ \diagdown\overset{S}{\underset{\parallel}{P}}SCH_2C\equiv CCH_2N\diagup C_2H_5\\ C_2H_5O\diagup \diagdown C_2H_5\end{array}$$

A suitable reactor was charged with 20.3 grams (0.1 mole) of ammonium O,O-diethyl phosphorodithioate in 200 ml. of acetone and 12.3 grams of 1,4-dichlorobutyne-2. The mixture was heated at refluxing temperature for 2 hours and then cooled. There was added 14.6 grams (0.2 mole) of diethylamine, and the resultant mixture was heated at refluxing temperature for 10 hours. An orange precipitate formed and was filtered out after the reaction mixture was cooled. The filtrate was stripped of acetone and extracted with chloroform. The residue was washed with water and stripped to 120° C. at 5 mm. pressure. There was obtained 20.8 grams (68% of theory) of O,O-diethyl S-(4-diethylamino)-2-butynyl phosphorodithioate.

EXAMPLE XVIII

O,O-*Diethyl S-(4-Ethoxycarbonylmethylamino)-2-Butynyl Phosphorodithioate*

$$\begin{array}{c}C_2H_5O\\ \diagdown\overset{S}{\underset{\parallel}{P}}SCH_2C\equiv CCH_2N\diagup H\\ C_2H_5O\diagup \diagdown CH_2\overset{O}{\underset{\parallel}{C}}OC_2H_5\end{array}$$

A reactor was charged with 8.1 grams (0.082 mole) of triethylamine and 5.6 grams (0.04 mole) of ethoxycarbonylmethylamine in 100 ml. of benzene, and 10.8 grams (0.04 mole) of S-(4-chloro-2-butynyl) O,O-diethyl phosphorodithioate and stirred at room temperature for 30 minutes. The mixture was then heated at refluxing temperature for 5 hours, after which it was filtered. The filtrate was washed with water and stripped to 100° C. at 1 mm. pressure. A yield of 9.2 grams (68% of theory) of O,O-diethyl S-(4-ethoxycarbonylmethylamino)-2-butynyl phosphorodithioate was obtained.

EXAMPLE XIX

O,O-*Diethyl S-(4-Ethoxycarbonylmethylamino)-2-Butynyl Phosphorothiolate*

$$\begin{array}{c}C_2H_5O\\ \diagdown\overset{O}{\underset{\parallel}{P}}SCH_2C\equiv CCH_2N\diagup H\\ C_2H_5O\diagup \diagdown CH_2\overset{O}{\underset{\parallel}{C}}OC_2H_5\end{array}$$

In the procedure of Example XVIII, 10.2 grams (0.04 mole) of thiolate was substituted for the dithioate. There was obtained 9.2 grams (68% of theory) of O,O-diethyl S-(4-ethoxycarbonylmethylamino)-2-butynyl phosphorothiolate.

EXAMPLE XX

O,O-*Diisopropyl S-(4-Diethylamino)-2-Butynyl Phosphorothiolate*

$$\begin{array}{c}(CH_3)_2CHO\\ \diagdown\overset{O}{\underset{\parallel}{P}}SCH_2C\equiv CCH_2N\diagup C_2H_5\\ (CH_3)_2CHO\diagup \diagdown C_2H_5\end{array}$$

Into a suitable reactor was charged 2.2 grams (0.03 mole) of diethylamine and 3.0 grams (0.03 mole) of triethylamine in 100 ml. of benzene, and 8.6 grams (0.03 mole) of S-(4-chloro-2-butynyl) O,O-diisopropyl phosphorothiolate. The procedure of Example XVIII was followed. A yield of 9.2 grams (96% of theory) of O,O-diisopropyl S-(4-diethylamino)-2-butynyl phosphorothiolate was obtained.

EXAMPLE XXI

O,O-Diethyl S-(4-Ethylamino)-2-Butynyl Phosphorodithioate

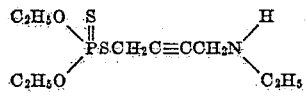

A reactor was charged with 2.6 grams (0.06 mole) of ethylamine and 5.0 grams (0.05 mole) of triethylamine in 100 ml. of benzene, and 13.6 grams (0.05 mole) of S-(4-chloro-2-butynyl) O,O-diethyl phosphorodithioate. The mixture was stirred at room temperature for 4 hours and then heated to refluxing temperature for an additional hour. The reaction product was worked up in the manner of Example XVIII except that it was stripped to 80° C. at 1 mm. pressure. A yield of 4.0 grams (28.4% of theory) of O,O-diethyl S-(4-ethylamino)-2-butynyl phosphorodithioate was obtained.

EXAMPLE XXII

O,O-Diethyl S-[4-Bis-(2-Cyanoethylamino)-2-Butynyl] Phosphorodithioate

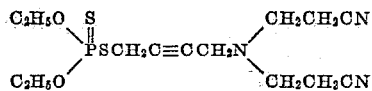

A suitable reactor was charged with 3.7 grams (0.03 mole) of bis-(2-cyanoethyl) amine and 3.0 grams (0.03 mole) of triethylamine in 100 ml. of benzene, and then 8.2 grams (0.03 mole) of S-(4-chloro-2-butynyl) O,O-diethyl phosphorodithioate was added. The mixture was heated at refluxing temperature for 4 hours, and the reaction product was filtered. The filtrate was washed with water and stripped to 80° C. at 1 mm. pressure. There was obtained 6.1 grams (56.6% of theory) of O,O-diethyl S-[4-bis-(2-cyanoethylamino)-2-butynyl] phosphorodithioate.

When 7.7 grams (0.03 mole) of thiolate was substituted for the dithioate in the charge, and the filtrate was stripped to 90° C. at 1 mm. pressure, 4.0 grams (39% of theory) of O,O-diethyl S-[4-bis-(2-cyanoethylamino)-2-butynyl] phosphorothiolate was obtained.

EXAMPLE XXIII

O,O-Diethyl S-(4-Morpholino)-2-Butynyl Phosphorothiolate

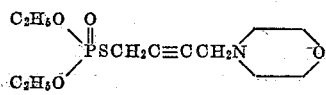

Into a suitable reactor was charged 11.6 grams (0.044 mole) of S-(4-chloro-2-butynyl) O,O-diethyl phosphorothiolate, 4.4 grams (0.05 mole) of morpholine, 5.1 grams (0.05 mole) of triethylamine and 100 ml. of acetone. The mixture was heated at refluxing temperature for 8 hours, and the reaction product was worked up as in Example II except that the final stripping was to 100° C. at 3 mm. pressure. A yield of 9.0 grams (67% of theory) of O,O-diethyl S-(4-morpholino)-2-butynyl phosphorothiolate was obtained.

EXAMPLE XXIV

O,O-Diethyl S-(4-Diethylmethylamino)-2-Butynyl Phosphorothiolate, Methosulfate Salt

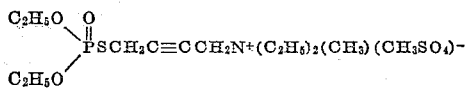

A reaction flask protected by a calcium sulfate drying tube was charged with 9.0 grams (0.0308 mole) of the thiolate formed in Example I and 3.94 grams (0.0308 mole) of methyl sulfate. The mixture was allowed to stand overnight. A supernatant layer which formed was decanted leaving a residual oil which was evacuated at 50° C. with a pump (2–4 mm. pressure). A yield of 9.4 grams (70% of theory) of the methosulfate salt was obtained.

EXAMPLE XXV

4-[O,O-Diethoxyphosphinylthio]-2-Butynyl-Triethylammonium Iodide

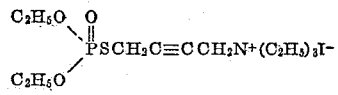

In the procedure of Example XXIV, 6.2 grams (0.04 mole) of ethyl iodide was substituted for the sulfate. There was obtained 11.2 grams (81% of theory) of the triethylammonium iodide.

EXAMPLE XXVI

O,O-Diethyl S-(4-Piperidino)-2-Butynyl Phosphorothiolate

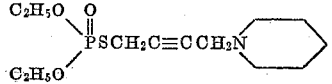

A suitable reactor was charged with 4.3 grams (0.05 mole) of piperidine and 5.1 grams (0.05 mole) of triethylamine in 100 ml. of chloroform. There was then added 12.3 grams (0.05 mole) of S-(4-chloro-2-butynyl) O,O-diethyl phosphorothiolate in 50 ml. of chloroform, and the mixture was heated at refluxing temperature for 4 hours. The reaction product was washed with water and stripped to 110° C. at 3 mm. pressure. There was obtained 10.5 grams (65% of theory) of O,O-diethyl S-(4-piperidino)-2-butynyl phosphorothiolate.

When 4.5 grams (0.05 mole) of N-methylpiperazine was substituted for the piperidine, a yield of 9.5 grams (59% of theory) of N-methyl N'-[diethoxyphosphinothioyl-(2-butynyl)] piperazine was obtained.

EXAMPLE XXVII

N-Methyl N'-[Diethoxyphosphinothioylthio-(2-Butynyl)] Piperazine

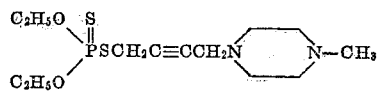

Into a reactor was charged 4.5 grams (0.05 mole) of N-methylpiperazine, 5.1 grams (0.05 mole) of triethylamine, 13.7 grams (0.05 mole) of S-(4-chloro-2-butynyl) O,O-diethyl phosphorodithioate and 100 ml. of chloroform. The mixture was heated at refluxing temperature for 8 hours and then cooled. The reaction product was filtered, and the filtrate was washed with water and stripped to 110° C. at 3 mm. pressure. There was obtained 13.5 grams (80% of theory) of N-methyl N'-[-diethoxyphosphinothioylthio-(2-butynyl)] piperazine. Analysis showed 9.2% phosphorus, 19.1% sulfur and 8.7% nitrogen as compared with calculated values of 9.5% phosphorus, 18.7% sulfur and 7.6% nitrogen.

When 4.6 grams (0.05 mole) of piperidine is substituted for the piperazine and the stripping pressure is 2 mm., a yield of 13.3 grams (83% of theory) of O,O-diethyl S-(4-piperidino)-2 - butynyl phosphorodithioate is obtained.

EXAMPLE XXVIII

*O,O-Diethyl S-(4-Morpholino)-2-Butynyl Phosphorodithioate*

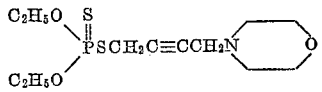

A suitable reactor was charged with 3.5 grams (0.04 mole) of morpholine, 4.1 grams (0.04 mole) of triethylamine and 150 ml. of chloroform. There was then added 10.9 grams (0.04 mole) of S-(4-chloro-2-butynyl) O,O-diethyl phosphorodithioate, and the mixture was heated at refluxing temperature for 4 hours. The reaction product was washed with water and stripped to 100° C. A yield of 11.5 grams (89% of theory) of O,O-diethyl S-(4-morpholino) - 2 - butynyl phosphorodithioate was obtained.

EXAMPLE XXIX

*O,O-Diethyl S-(4-Diethylamino) - 2 - Butynyl Phosphorothiolate, Oxalate Salt*

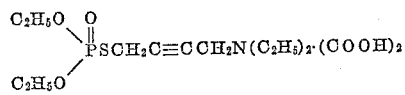

A suitable reactor, protected as in Example XXIV, was charged with 2.8 grams (0.0308 mole) of oxalic acid in 100 ml. of methanol and 9.0 grams (0.0308 mole) of the product of Example I in 100 ml. of methanol. The mixture was shaken occasionally and allowed to stand overnight. A small precipitate which formed was filtered off, and the solvent was removed from the filtrate under vacuum. A 100% yield of O,O-diethyl S-(4-diethylamino)-2-butynyl phosphorothiolate, oxalate salt, was obtained as an amber oil.

EXAMPLE XXX

*O,O-Di(Methoxyethyl) S-(4-Diethylamino) - 2 - Butynyl Phosphorodithioate*

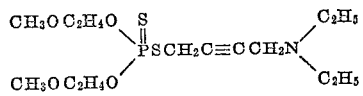

A suitable reactor was charged with 12.3 grams (0.1 mole) of 1,4-dichlorobutyne-2 in 150 ml. of acetone. There was added 24.6 grams (0.1 mole) of O,O-di(methoxyethyl) phosphorodithioic acid reacted with 10.1 grams (0.1 mole) of triethylamine. The mixture was heated at refluxing temperature for 3 hours after which 14.6 grams (0.2 mole) of diethylamine was added with cooling. The resultant mixture was heated at refluxing temperature for 4 hours. The reaction product was stripped of acetone. The residue was extracted with methylene chloride and washed with water. Stripping to 130° C. at 1 mm. of pressure yielded 17.2 grams of O,O-di(methoxyethyl) S-(4-diethylamino)-2 - butynyl phosphorodithioate.

EXAMPLE XXXI

*O,O-Diethyl O-(4-Diethylamino)-2-Butynyl Phosphorothionate*

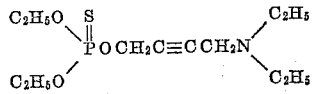

To a reactor charged with 10.5 grams (0.1 mole) of 4-chloro-2-butyne-1-ol in 100 ml. of acetone, there was added, with cooling and agitation, 18.9 grams (0.1 mole) of O,O-diethyl phosphorochloridothioate in 50 ml. of acetone. This was followed by addition of 20.2 grams (0.2 mole) of triethylamine, and the mixture was heated at refluxing temperature for 4 hours. It was then cooled, and 7.3 grams (0.1 mole) of diethylamine was added. This latter mixture was heated at refluxing temperature for another 4 hour period, after which it was cooled, filtered and washed with fresh acetone. The acetone was then stripped, and the residue was extracted with methylene chloride. The extracts were washed with water and stripped to 110° C. at 1 mm. of pressure to yield O,O-diethyl O-(4-diethylamino)-2-butynyl phosphorothionate as an amber liquid.

EXAMPLE XXXII

*O,O-Diisopropyl S-(4-Morpholino)-2-Butynyl Phosphorothiolate*

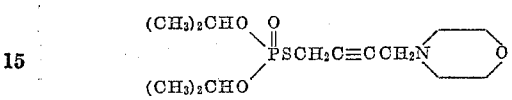

A suitable reactor was charged with 2.6 grams (0.03 mole) of morpholine and 3.0 grams (0.03 mole) of triethylamine in 75 ml. of benzene, and 8.6 grams (0.03 mole) of S-(4-chloro-2-butynyl) O,O-diisopropyl phosphorothiolate. The mixture was heated at refluxing temperature for 5 hours, and the reaction product was worked up as in Example II except that the final stripping was to 110° C. at 1 mm. of pressure. There was obtained 8.3 grams (84% of theory) of O,O-diisopropyl S-(4-morpholino)-2-butynyl phosphorothiolate.

The same procedure was followed with a charge of 3.0 grams (0.03 mole) of triethylamine, 3.5 grams (0.03 mole) of 3,5-dimethylmorpholine, 7.7 grams (0.03 mole) of S-(4-chloro-2-butynyl) O,O-diethyl phosphorothiolate and 75 ml. of benzene. With a final stripping to 90° C. at 1 mm. of pressure, the yield was 6.5 grams of O,O-diethyl S-[4-(3,5-dimethylmorpholino)-2 - butynyl] phosphorothiolate. Analysis showed 9.2% phosphorus and 4.4% nitrogen as compared with calculated values of 9.4% phosphorus and 4.3% nitrogen.

EXAMPLE XXXIII

*O,O-Diisopropyl S-(4-Diethylamino)-2-Butynyl Phosphorothiolate*

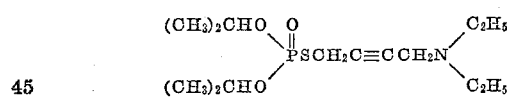

A suitable reactor was charged with 2.2 grams (0.03 mole) of diethylamine and 3.0 grams (0.03 mole) of triethylamine in 100 ml. of benzene, and 8.6 grams (0.03 mole) of S-(4-chloro-2-butynyl) O,O-diisopropyl phosphorothiolate. Following the procedure of Example XVIII, a yield of 9.2 grams (96% of theory) of O,O-diisopropyl S-(4-diethylamino) - 2 - butynyl phosphorothiolate was obtained as an amber oil.

The specific activity of individual compounds disclosed herein is enumerated below. At the outset it should be made clear that such data is merely exemplary, and that similar results are obtained by employing any of the other compounds within the scope of this invention. Several compounds were tested as systemic pesticides by immersing the excised stems of bean plants in diluted emulsions of the chemicals for three days. Leaves were then excised, infested with the selected insects, and the percent kill was noted after 48 hours. Tested against the two-spotted spider mite, emulsions containing 100 p.p.m. of O,O-diethyl S-(4-diethylamino) - 2 - butynyl phosphorothiolate killed 100% of the test organisms. A kill of 100% was also achieved with 100 p.p.m. concentrations of O,O-diethyl S-(4-morpholino)-2-butynyl phosphorothiolate, O,O-diethyl S-(4-diallylamino)-2-butynyl phosphorothiolate, O,O-diethyl S-(4-dimethylamino)-2-butynyl phosphorothiolate, O,O - diethyl S - (4 - diallylamino-2-butynyl phosphorodithioate, and O,O-diethyl S-(4-allylamino)-2-butynyl phosphorothiolate. Systemic tests against the bean beetle showed 100% kill at a concentration of 0.63 p.p.m. with O,O-diethyl S-(4-morpholino)-2-butynyl phosphorothiolate.

The insecticidal effectiveness of the new compounds was also demonstrated in contact tests on the mobile and resting stages, as well as on the ova, of the two-spotted spider mite. Concentrations of .1% resulted in 100% kill with such compounds as O,O-diethyl S-(4-diethylamino)-2-butynyl phosphorodithioate, O,O-diethyl S-(4-diethylamino)-2-butynyl phosphorothiolate and O,O-diethyl S-(4-dimethylamino)-2-butynyl phosphorothiolate. Against yellow fever mosquito larvae, concentrations of 10 p.p.m. of the active ingredient gave 100% kill using O,O-diethyl S-(4-dimethylamino)-2-butynyl phosphorothiolate, O,O-diethyl S-(4-ethylamino)-2-butynyl phosphorothiolate, O,O-diethyl S-(4-allylamino) - 2 - butynyl phosphorothiolate, O,O-diethyl S - (4 - diethylamino)-2-butynyl phosphorothiolate, and O,O-diethyl S-(4-diallyl)-2-butynyl phosphorodithioate. The latter three compounds gave kills of 80, 90 and 100% respectively against the same insect at concentrations of 2.5 p.p.m.

It will be understood that the terms "insect" and "insecticide" are used herein in their broad common usage to include spiders, mites, ticks and like pests which are not in the strict biological sense classed as insects. Thus, the usage herein conforms to the definitions provided by Congress in Public Law 104, the "Federal Insecticide, Fungicide and Rodenticide Act" of 1947, Section 2, subsection h, wherein the term "insect" is used to refer not only to those small invertebrate animals belonging mostly to the class Insecta, comprising six-legged, usually winged forms, as beetles, bugs, bees, flies, and so forth, but also to their allied classes of arthropods whose members are wingless and usually have more than six legs, as spiders, mites, ticks, centipedes and wood lice.

For maximum effectiveness the active ingredients of the present invention are admixed in insecticidally effective amount with a insecticidal adjuvant. In order to provide formulations particularly adapted for ready and efficient application to insects using conventional equipment, such formulations comprise those of both the liquid and solid types as well as the "aerosol" type formulations. Application may be directly to the insects to the plant hosts of such insect to soil or other media used for growing plants. In the pure state the active ingredients may be too effective or too potent in some applications to have practical utility. For example, for most effective protection, it is preferred to apply the materials in intimate contact but thoroughly dispersed on the surface to be protected. Therefore, the active ingredients have incorporated therewith a relatively inert surface-active agent or adjuvant as a dispersing medium. Furthermore, such adjuvants have the effect of requiring only minute quantities of said ingredients of some formulations to obtain effective protection. A further advantage of so extending this material is to permit field application by methods readily employed and still obtain effectively complete coverage of the material being protected.

Thus, the formulations of this invention comprise the above defined active ingredients and a suitable material as an adjuvant, therefor. The important feature of the invention is to provide an adjuvant such that upon the preparation of a formulation of a concentration appropriate for any particular application the adjuvant will be present to provide the proper type of contact with the material being protected. Thus, in one embodiment the adjuvant can comprise a surface-active agent such as a detergent, a soap, or other wetting agent. Such a formulation then comprises the active ingredient in combination with a minor proportion of the surface-active agent or adjuvant. Such a formulation is of practical merit because of its concentrated form and ease of transportation, storage, and the like. Such a formulation lends itself directly to further dilution with a diluent or carrier without resorting to complicated mixing and blending procedures. Thus, such a formulation can be further diluted with a solid carrier of the dust type by a simple mixing operation. Likewise, such a formulation can be directly suspended in water or can be further diluted with an oil which upon mixing with water thereby forms an oil-in-water emulsion containing the active ingredient. One further example of the utility of such a formulation comprises the preparation by further dilution with a solid carrier of a wettable powder which upon admixture with water prior to application forms a dispersion of the active ingredient and the solid carrier in water.

In the preparation of the above-described concentrates, the active ingredient may comprise up to about 95% of the concentrated formulation. To obtain 100 parts of a ready to use liquid formulation, from 1 to 50 parts of a concentrate is admixed with from 50 to 99 parts of a diluent or carrier. Although it is not intended that this invention be limited to any specific proportions of active ingredient and adjuvant, it should be noted that ready to use liquid formulations comprising from about 0.001 to 5% of the active ingredient based upon the weight of the formulation are preferred. In such liquid formulations it is also preferred that the adjuvant comprise less than about 5% based upon the weight of the formulation. With ready to use solid formulations, the parts of concentrate and diluent or carrier are substantially the same as defined for the liquids. However, in such solid formulations, the use of from about 2.5 to 25% of the active ingredient based upon the weight of the formulation is preferred. The percentage of adjuvant preferred in the solids is substantially the same as in the liquid formulations.

It is also intended that the term "adjuvant" includes solid carriers of the type of pyrophyllite, talc, clay, diatomaceous earth, and the like; and various mineral powders, such as calcium sulfate and the like, which act as a dispersant, as a carrier, and in some instances perform the function of a surface-active agent.

Another method of applying these insecticides is in the form of a water suspension. However, to obtain an active aqueous suspension, there should be employed a surface-active agent in sufficient amount to disperse and suspend the active ingredient. Examples of such surface-active agents which can be employed in forming dispersions include the soft or hard sodium or potassium soaps, tall oil, salts of the alkyl and alkylaryl sulfonates; alkyl sulfates; alkylamide sulfonates, including fatty methyl taurides; the alkylaryl polyether alcohols; the fatty acid esters of polyhydric alcohols; the ethylene oxide addition products of such esters; and the addition products of long-chain mercaptans and ethylene oxide. Still other surface-active agents can be employed, the above merely showing a representative list of the more common materials.

It should be pointed out that the formulations of this invention may also include sticking or adhesive agents, indicators and other active biocidal ingredients. Such other ingredients may be supplementary insecticides, fungicides, bacteriocides, nematocides or selective herbicides.

While the invention has been specifically described with regard to several embodiments, it is not thereby limited, and it is to be understood that modifications and variations thereof obvious to those skilled in the art may be made without departing from the spirit or scope of the invention.

What is claimed is:
1. A compound of the formula

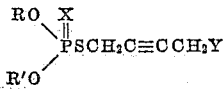

where R and R' are selected from the group consisting of lower alkyl and alkoxy substituted lower alkyl, X is selected from oxygen and sulfur, and Y is a di-lower acyclic amino.

2. O,O-diethyl S-(4-diethylamino)-2-butynyl phosphorothiolate.

3. O,O-diethyl S-(4-diallylamino)-2-butynyl phosphorothiolate.

4. O,O-diethyl S-(4-dimethylamino)-2-butynyl phosphorothiolate.

5. O,O-diethyl S-(4-diethylamino)-2-butynyl phosphorodithioate.

6. O,O-diethyl S-(4-morpholino)-2-butynyl phosphorothiolate.

7. A compound of the formula $$\begin{array}{c} RO \\ \diagdown \overset{X}{\underset{\parallel}{P}}X'CH_2C{\equiv}CCH_2Y \\ R'O \diagup \end{array}$$

where R and R' are selected from the group consisting of lower alkyl and alkoxy substituted lower alkyl, X and X' are selected from the group consisting of oxygen and sulfur, and Y is selected from the group consisting of (1) heterocyclics of from 3 to 7 nuclear atoms and of the formula —$NL_n$ where L is a divalent chain of 2 to 6 members, said members consisting of 1 to 6 carbon atoms and 0 to 1 nitrogen atom, (2) morpholino, (3) quaternary ammonium salt radicals, and (4) $-N\begin{array}{c}\diagup R'' \\ \diagdown R''' \end{array}$ where R'' and R''' are selected from the group consisting of alkyl, alkenyl and alkynyl of 1 to 8 carbon atoms, the monochloro derivatives of said alkyl, alkenyl and alkynyl, alkoxy substituted lower alkyl, cyano lower alkyl, hydroxy lower alkyl, alkoxycarbonyl lower alkyl, cycloalkyl of 5 to 7 carbon atoms, benzyl, phenyl, naphthyl, chlorophenyl, nitrophenyl and alkoxyphenyl.

8. An insecticidal formulation comprising an insecticidal adjuvant and, as an essential active ingredient thereof, a compound of the formula $$\begin{array}{c} RO \\ \diagdown \overset{X}{\underset{\parallel}{P}}X'CH_2C{\equiv}CCH_2Y \\ R'O \diagup \end{array}$$

where R and R' are selected from the group consisting of lower alkyl and alkoxy substituted lower alkyl, X and X' are selected from the group consisting of oxygen and sulfur, and Y is selected from the group consisting of (1) heterocyclics of from 3 to 7 nuclear atoms and of the formula —$NL_n$ where L is a divalent chain of 2 to 6 members, said members consisting of 1 to 6 carbon atoms and 0 to 1 nitrogen atom, (2) morpholino, (3) quaternary ammonium salt radicals, and (4) $-N\begin{array}{c}\diagup R'' \\ \diagdown R''' \end{array}$ where R'' and R''' are selected from the group consisting of alkyl, alkenyl and alkynyl of 1 to 8 carbon atoms, the monochloro derivatives of said alkyl, alkenyl and alkynyl, alkoxy substituted lower alkyl, cyano lower alkyl, hydroxy lower alkyl, alkoxycarbonyl lower alkyl, cycloalkyl of 5 to 7 carbon atoms, benzyl, phenyl, naphthyl, chlorophenyl, nitrophenyl and alkoxphenyl.

9. An insecticidal formulation comprising an insecticidal adjuvant and, as an essential active ingredient thereof, a compound of the formula $$\begin{array}{c} RO \\ \diagdown \overset{X}{\underset{\parallel}{P}}SCH_2C{\equiv}CCH_2Y \\ R'O \diagup \end{array}$$

where R and R' are selected from the group consisting of lower alkyl and alkoxy substituted lower alkyl, X is selected from oxygen and sulfur, and Y is a di-lower acyclic amino.

10. A method of protecting plants from insects which comprises treating the plant with a composition containing, as an essential active ingredient, a compound of the formula $$\begin{array}{c} RO \\ \diagdown \overset{X}{\underset{\parallel}{P}}X'CH_2C{\equiv}CCH_2Y \\ R'O \diagup \end{array}$$

where R and R' are selected from the group consisting of lower alkyl and alkoxy substituted lower alkyl, X and X' are selected from the group consisting of oxygen and sulfur, and Y is selected from the group consisting of (1) heterocyclics of from 3 to 7 nuclear atoms and of the formula —$NL_n$ where L is a divalent chain of 2 to 6 members, said members consisting of 1 to 6 carbon atoms and 0 to 1 nitrogen atom, (2) morpholino, (3) quaternary ammonium salt radicals, and (4) $-N\begin{array}{c}\diagup R'' \\ \diagdown R''' \end{array}$ where R'' and R''' are selected from the group consisting of alkyl, alkenyl and alkynyl of 1 to 8 carbon atoms, the monochloro derivatives of said alkyl, alkenyl and alkynyl, alkoxy substituted lower alkyl, cyano lower alkyl, hydroxy lower alkyl, alkoxycarbonyl lower alkyl, cycloalkyl of 5 to 7 carbon atoms, benzyl, phenyl, naphthyl, chlorophenyl, nitrophenyl and alkoxyphenyl.

11. A method of protecting plants from insects which comprises treating the plant with a composition containing, as an essential active ingredient, a compound of the formula $$\begin{array}{c} RO \\ \diagdown \overset{X}{\underset{\parallel}{P}}SCH_2C{\equiv}CCH_2Y \\ R'O \diagup \end{array}$$

where R and R' are selected from the group consisting of lower alkyl and alkoxy substituted lower alkyl, X is selected from oxygen and sulfur, and Y is a di-lower acyclic amino.

12. A method of combatting mites which comprises treating the mites externally and the mite habitats with a composition containing, as an essential active ingredient, a compound of the formula $$\begin{array}{c} RO \\ \diagdown \overset{X}{\underset{\parallel}{P}}X'CH_2C{\equiv}CCH_2Y \\ R'O \diagup \end{array}$$

where R and R' are selected from the group consisting of lower alkyl and alkoxy substituted lower alkyl, X and X' are selected from the group consisting of oxygen and sulfur, and Y is selected from the group consisting of (1) heterocyclics of from 3 to 7 nuclear atoms and of the formula —$NL_n$ where L is a divalent chain of 2 to 6 members, said members consisting of 1 to 6 carbon atoms and 0 to 1 nitrogen atom, (2) morpholino, (3) quaternary ammonium salt radicals, and (4) $-N\begin{array}{c}\diagup R'' \\ \diagdown R''' \end{array}$ where R'' and R''' are selected from the group consisting of alkyl, alkenyl and alkynyl of 1 to 8 carbon atoms, the monochloro derivatives of said alkyl, alkenyl and alkynyl, alkoxy substituted lower alkyl, cyano lower alkyl, hydroxy lower alkyl, alkoxycarbonyl lower alkyl, cycloalkyl of 5 to 7 carbon atoms, benzyl, phenyl, naphthyl, chlorophenyl, nitrophenyl and alkoxyphenyl.

13. A method of combatting insects which comprises treating the insects externally and the insect habitats with a composition containing, as an essential active ingredient, a compound of the formula

where R and R' are selected from the group consisting of lower alkyl and alkoxy substituted lower alkyl, X and X' are selected from the group consisting of oxygen and sulfur, and Y is selected from the group consisting of
(1) heterocyclics of from 3 to 7 nuclear atoms and of the formula —$NL_n$ where L is a divalent chain of 2 to 6 members, said members consisting of 1 to 6 carbon atoms and 0 to 1 nitrogen atom,
(2) morpholino,
(3) quaternary ammonium salt radicals, and (4) 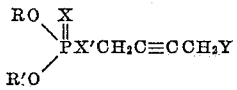

where R'' and R''' are selected from the group consisting of alkyl, alkenyl and alkynyl of 1 to 8 carbon atoms, the monochloro derivatives of said alkyl, alkenyl and alkynyl, alkoxy substituted lower alkyl, cyano lower alkyl, hydroxy lower alkyl, alkoxycarbonyl lower alkyl, cycloalkyl of 5 to 7 carbon atoms, benzyl, phenyl, naphthyl, chlorophenyl, nitrophenyl and alkoxyphenyl.

14. A method of combatting insects which comprises treating the insects externally and the insects habitats with a composition containing, as an essential active ingredient, a compound of the formula

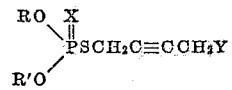

where R and R' are selected from the group consisting of lower alkyl and alkoxy substituted lower alkyl, X is selected from oxygen and sulfur, and Y is a di-lower acyclic amino.

References Cited in the file of this patent

UNITED STATES PATENTS

| | | |
|---|---|---|
| 2,648,696 | Whetstone | Aug. 11, 1953 |
| 2,706,194 | Morris et al. | Apr. 12, 1955 |
| 2,841,517 | Boon et al. | July 1, 1958 |
| 2,865,801 | Baker et al. | Dec. 23, 1958 |
| 2,906,661 | Baker et al. | Sept. 29, 1959 |
| 2,960,429 | Baket et al. | Nov. 15, 1960 |